(12) United States Patent
Kwok et al.

(10) Patent No.: US 6,793,344 B2
(45) Date of Patent: Sep. 21, 2004

(54) OPTICAL SYSTEMS FOR LIQUID CRYSTAL DISPLAY PROJECTORS

(75) Inventors: Hoi-Sing Kwok, Kowloon (HK); Ho-Chi Huang, Kowloon (HK)

(73) Assignee: Integrated Microdisplays Limited, Kowloon (HK)

( * ) Notice: Subject to any disclaimer, the term of this patent is extended or adjusted under 35 U.S.C. 154(b) by 24 days.

(21) Appl. No.: 09/996,685

(22) Filed: Nov. 30, 2001

(65) Prior Publication Data

US 2002/0196413 A1 Dec. 26, 2002

Related U.S. Application Data

(63) Continuation-in-part of application No. 09/888,570, filed on Jun. 26, 2001, now abandoned.

(51) Int. Cl.$^7$ .................. G03B 21/00; G03B 21/14; G02F 1/1335
(52) U.S. Cl. .................. 353/84; 353/31; 349/9
(58) Field of Search .................. 353/39, 31, 84, 353/122; 349/5, 8, 9, 10, 18, 30, 108

(56) References Cited

U.S. PATENT DOCUMENTS

| | | | |
|---|---|---|---|
| 4,687,301 A | | 8/1987 | Ledebuhr |
| 4,969,730 A | | 11/1990 | van den Brandt |
| 5,644,432 A | | 7/1997 | Doany |
| 5,658,060 A | | 8/1997 | Dove |
| 5,953,083 A | | 9/1999 | Sharp et al. |
| 6,176,586 B1 | * | 1/2001 | Hirose et al. .................. 353/31 |
| 6,183,091 B1 | * | 2/2001 | Johnson et al. ............... 353/20 |
| 6,464,359 B1 | * | 10/2002 | Owen et al. .................. 353/31 |
| 2002/0027619 A1 | * | 3/2002 | Robinson ....................... 349/9 |
| 2002/0159033 A1 | * | 10/2002 | van Gelder et al. .......... 353/20 |

* cited by examiner

Primary Examiner—Russell Adams
Assistant Examiner—Andrew Sever
(74) Attorney, Agent, or Firm—Burns, Doane, Swecker & Mathis, L.L.P.

(57) ABSTRACT

The present invention describes several embodiments of optical systems for the projection of images formed on reflective liquid crystal light valves. These light valves are capable of high resolution and very small sizes. The optical systems described are able to project these images with highly efficient utilization of light from an arc lamp source and are also very compact and easy to manufacture.

62 Claims, 16 Drawing Sheets

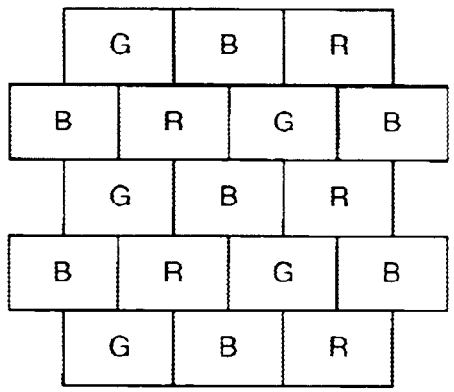
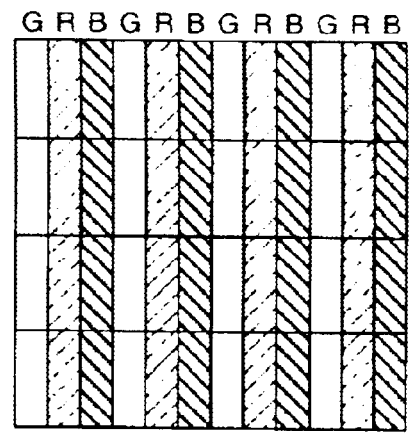
Fig. 19a
Fig. 19b
Fig. 19c
Fig. 19d though the 3 prisms can be glued
OPTICAL SYSTEMS FOR LIQUID CRYSTAL DISPLAY PROJECTORS This disclosure is a continuation-in-part of application Ser. No. 09/888,570 filed Jun. 26, 2001, now abandoned, the entire content of which is incorporated by reference.

FIELD OF THE INVENTION

This invention relates to novel designs for the optical system used in liquid crystal projectors. In particular, these designs relate to projectors that make use of reflective liquid crystal light valves. There are two major arrangements to be disclosed. In one arrangement, three reflective liquid crystal panels are used for full color projection displays. In the other arrangement, two liquid crystal panels are use for full color projection. In the latter case, one of the panels is used for green light and the other panel is used to modulate both blue and red lights.

PRIOR ART

Liquid crystal display projectors are normally based on transmittive type panels. Such liquid crystal projectors are produced commercially and many standard designs for their optical arrangements are in use. With the introduction of reflective liquid crystal light valves, the projection optics inside the projectors has to be totally redesigned. This is particularly true for full color projection displays utilizing silicon backplane microdisplays. Of particular interest are designs that are compact, high throughput, small F-number, high contrast and high brightness. For compactness, it is necessary for the color separation and color recombination to be carried out in the same set of optical elements.

The optical system of a full color reflective mode LC light valves projection, must have following characteristics: (1) Large output light flux, which means large system optical invariance, or system etandue with the LC light valves. (2) Dual-polarization utilization. (3) High efficiency color separation and recombination which is polarization independent. (4) Compact and small retrofocus for the projection lens. The color separation and recombination prisms disclosed in the prior art do not meet these requirements. It is the purpose of the present invention to disclose a color splitting/recombining prism which is of high efficiency and compact and easy to align and manufacture.

In the conventional reflective projector system, the collimated light source is first split into three primary colors by two dichroic color filters (usually with a first blue filter and a second red filter). Then these light beams are directed onto the corresponding light valves along different optical paths. The reflected light beams, having changed polarizations, are then recombined using two dichroic filters. These filters can be the same set of color separating filters or different ones. The reflected light is separated from the incident light using a polarizing beam splitter (PBS) and finally projected onto the screen. U.S. Pat. No. 4,687,301 discloses one such color separation-recombining optical assembly. Dichroic filters immersed in index matching fluid are used for both color separation and recombination. The angle of incidence on the blue filter is 24° while it is 12° on the red filter. At an incidence angle of 24°, there is considerable s-p polarization shift of the band edge of the dichroic filters.

U.S. Pat. No. 4,969,730 describes a three-prism assembly which is commonly known as a color splitting prism. This prism acts as both a color separator and a color recombiner. It is in principle the same as the invention disclosed in U.S. Pat. No. 4,687,301, but much improved in terms of ease of fabrication. The blue filter and red filter are coated onto the surfaces of the prisms. The angles of incidence are all 30°. A PBS is also used to separate the incident beam from the polarization modulated reflected beam. At the incidence angle of 30°, however, the problem of s-p polarization shift is greater.

U.S. Pat. No. 5,644,432 describes a projection system where the color separator and recombiner consist of the same three-prism assembly. A PBS is used to separate the incident and reflected light beams. In this case, there is no air gap in the blue filter so that the 3 prisms can be glued together. The blue and red dichroic filters have large angles of incident of 30° in order to maintain a short back working distance for the projective lens.

In U.S. Pat. No. 5,658,060, Dove et al described a prism assembly whereby color separation and recombination can be carried out using two coatings with the assistance of total internal reflections. Kwok et al (H. S. Kwok et el, Applied Optics, Vol.39, pp168–172, 2000) described a significant improvement of that prism assembly by reducing the s-p polarization splitting of the dichroic coatings. This was accomplished by reducing the angle of incidence on all the dichroic coatings from 24° to 16°. The three-prism designs are called trichroic prism assemblies.

While the s-p polarization shift effect has been greatly reduced, the trichroic prism assembly is quite difficult to assemble. Additionally, air gaps are needed in the assembly of the prisms. Stray reflection inside the prism is quite troublesome. The optical path length is also rather large, as there are quite a few prisms. This makes the back focal length of the projector lens quite long, which results in design complexity and small acceptance angles.

In U.S. Pat. No. 5,953,083, Sharp et al describes a color separation filter stack whereby the polarization direction of a particular color band can be rotated by 90°, while leaving the rest of the light unchanged in polarization. This color separation filter stack is the basis of a projector with 4 polarizing beam splitters (PBS). In this design, the color separation and color recombination occur at different optical surfaces. Yet the design is quite compact and the back focal length of the projection lens can be quite short, resulting in a good optical design.

SUMMARY OF THE INVENTION

The present invention describes further improvement in the optical arrangement of the LCD projector whereby the number of optical elements have been reduced significantly. Moreover, the requirements on the coatings have been reduced so that mass production is possible. In the present invention, the number of PBS in the entire projection system is reduced to one or two. The required back focal length of the projection lens is also very short, being the dimension of one or two PBS.

In the present invention, the color separation filter stack as described by Sharp et al can be utilized to separate out the complementary green and magenta lights. This filter stack is used if the input light is linearly polarized. Alternatively, if the input light is unpolarized, a simpler arrangement of just one PBS can be used, without the need for the color separation filter stack. But the disadvantage is that half of the light will not be utilized in the image formation process. This is often acceptable since the resulting optical arrangement is so simple and can have very small F-numbers that can more than compensate for the brightness of the projector.

One important feature and requirement for the present invention is the entrance PBS that has to be broadband and has to have wide acceptance angle. This kind of PBS is available from many sources and will not be the subject of the present invention.

BRIEF DESCRIPTION OF THE DRAWINGS

Some embodiments of the invention will now be described by way of example and with reference to the accompanying drawings, in which:

FIGS. 16a and 16b illustrate examples of a magenta light valve, FIGS. 17a and 17b illustrate examples of a cyan light valve, FIGS. 18a and 18b illustrate examples of a yellow light valve, FIGS. 19a–19d illustrate examples of a red/green/blue light valve.

DETAILED DESCRIPTION OF EMBODIMENTS OF THE INVENTION

The essential elements of an optical projection system are the light source, the polarization management optics that turns as much of the light into a particular polarization as possible, the dichroic filters for separating the light into red (Red) green (Green) and blue (Blue) channels, the light valves providing the image, the color recombination optics and the projection lens. The present invention is concerned only with the color separation and recombination schemes. Specific designs of the light valve, the polarization converter, the projection lens, are not discussed.

Figure 1:
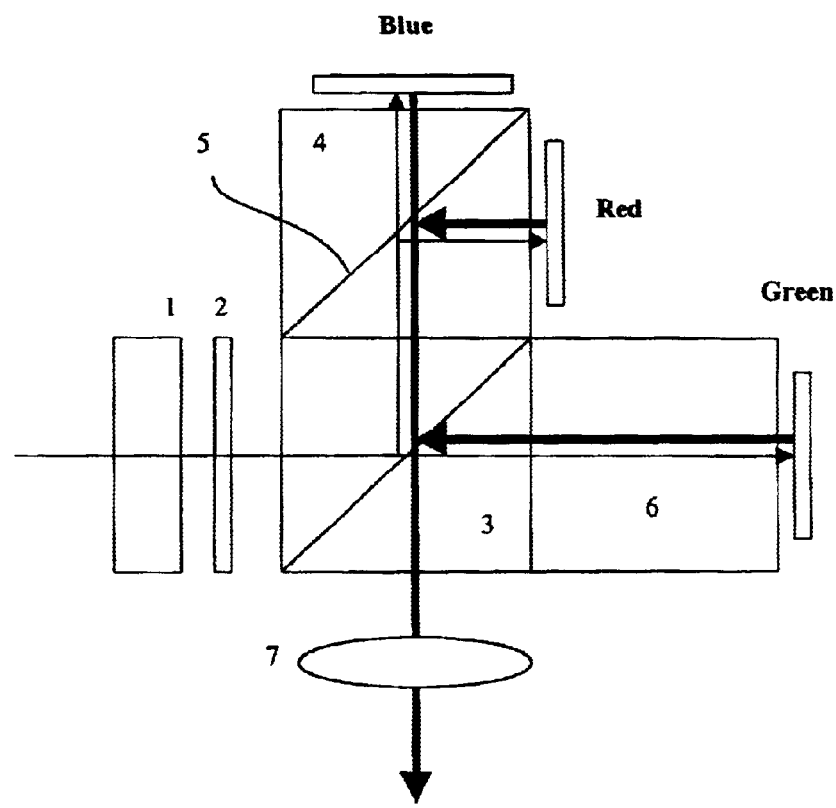
FIG. 1 shows the first preferred embodiment of the present invention.

The light coming into the projection system is provided by an arc lamp. A polarization conversion system 1 is used to convert as much of the light into s- or p-polarization. In the first preferred embodiment of the present invention, p-polarization is assumed to be used after the polarization conversion system 1. The optical arrangement is as shown in FIG. 1. This arrangement makes use of a retardation stack 2 where the green band of light is rotated to become s-polarized. The remaining portion of the visible light (red and blue) remains p-polarized. This red and blue light band is also called magenta due to color addition. It is complementary to green.

Figure 2:
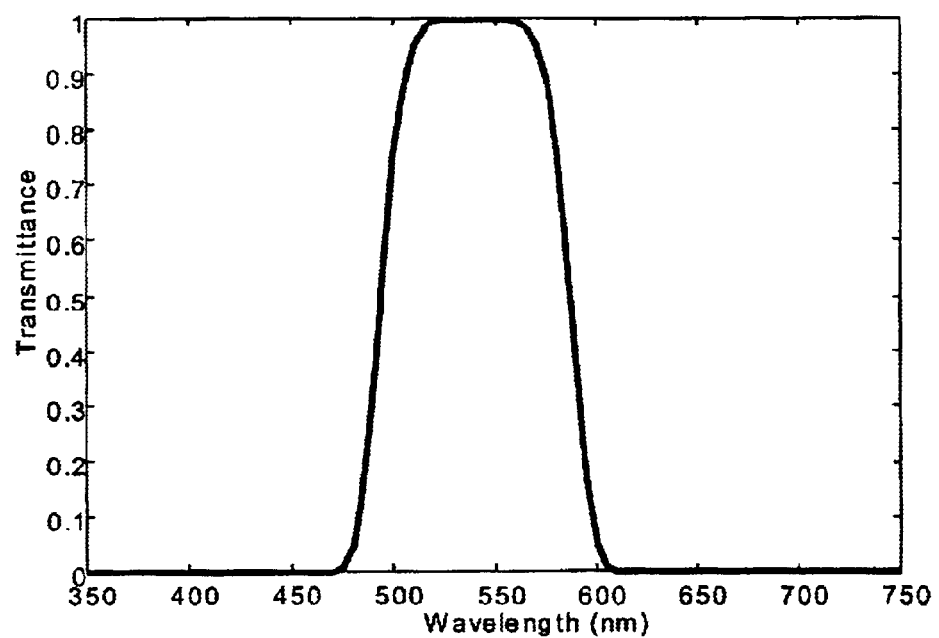
FIG. 2 shows the transmittance of the combination of the polarization conversion system, the polarization rotator and the PBS.

These light bands enter a broadband large acceptance angle polarizing beam splitter (PBS) 3. The function of this PBS is simply to separate s- and p-polarized lights. As always, p-polarized light goes through the PBS while s-polarized light is reflected. Since the green light is p-polarized, it passes through the PBS. On the other hand, the s-polarized red and blue lights (magenta) are reflected by the PBS. FIG. 2 shows the transmitted green light after going through the polarization converter assembly 1, retardation film stack 2, and PBS 3. The reflected light is the exact complementary color to this green light.

The transmitted green light is sent into a compensating glass block 6 where it is modulated by a green liquid crystal light valve Green, which is constructed of a silicon microdisplay. This light valve modulates the polarization of the incoming light and reflects it back to the PBS. The modulated green light becomes s-polarized and is reflected by PBS 3 into the projection lens 7.

Figure 3:
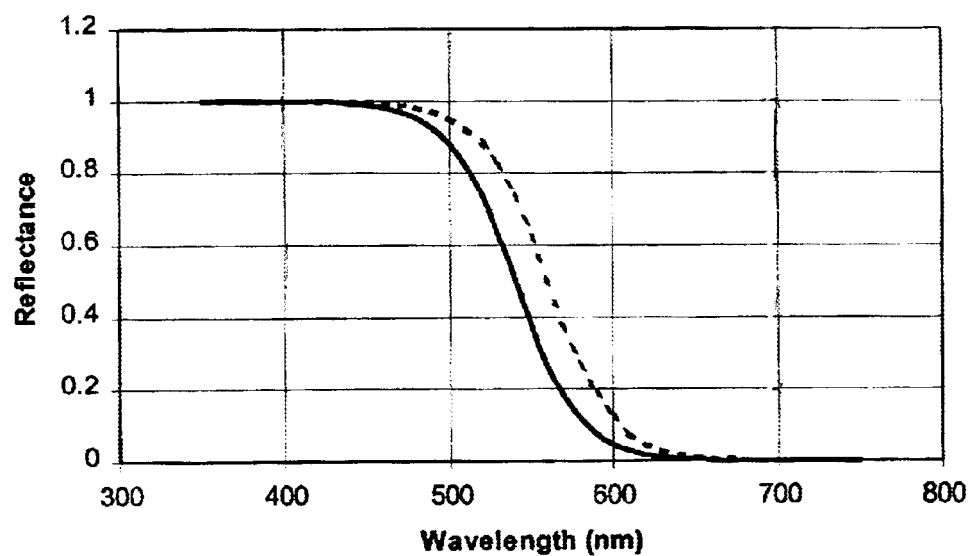
FIG. 3 shows the reflectance of the dichroic filter.

The reflected s-polarized blue and red light from PBS 3 enter a beam splitter 4 coated with a dichroic filter 5. This dichroic coating 5 separates red from blue light and is non-polarizing. In one preferred embodiment, the red light is reflected and blue light is transmitted as shown in FIG. 3. The separated red and blue light impinges on the red Red and blue Blue liquid crystal light valves respectively and is reflected after modulation. The polarization of the red and blue light is modulated by the light valve, which turns the s-polarized light into p-polarized upon modulation.

In a variation of the first preferred embodiment, the transmitted green light going into glass block 6 can be further purified by green filter 8 to enhance the color saturation of the projector.

In the present optical designs, it is important that the dichroic beam splitter coating 5 of prism 4 is independent of the polarization of the light so that the entire light band is transmitted without further polarization change. This color filter beam splitter 4 is designed for an incident angle of 45°. At this angle, it is unavoidable to have a s-p polarization split for the dichroic filter. Take for example a filter that is designed to reflect blue light as shown in FIG. 3. The reflectance spectrum is different for the s- and p-polarized light. However, for the optical arrangement in FIG. 1, this beam splitter coating 5 is used to separate red and blue light. So if the edge reflection filter is designed with an edge wavelength in the green region, the s-p polarization split will not have any effect on the filter. Blue light of both s- and p-polarization will be reflected. Similarly, red light of both s- and p-polarizations will be transmitted.

The modulated red and blue (magenta) light enters the PBS 3 and is passed by it and sent to the projection lens 7. Essentially, the modulated red, green and blue light bands are combined by the same PBS 3 and are projected by the lens 7. In the green channel, a piece of glass 6 is inserted in order to make the optical light path for all beams to be the same. Glass cube 6 and color filter cube 4 should be made of the same material in order to avoid unnecessary optical delays and difference in magnification.

Figure 4:
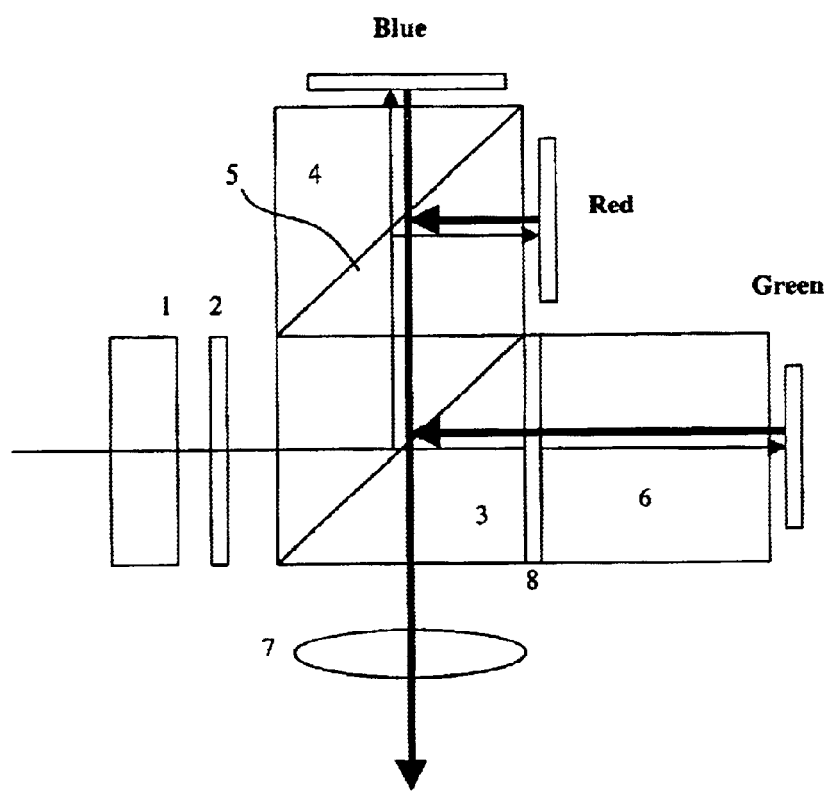
FIGS. 4–8 show variations of the first preferred embodiment of the present invention.
Figure 5:
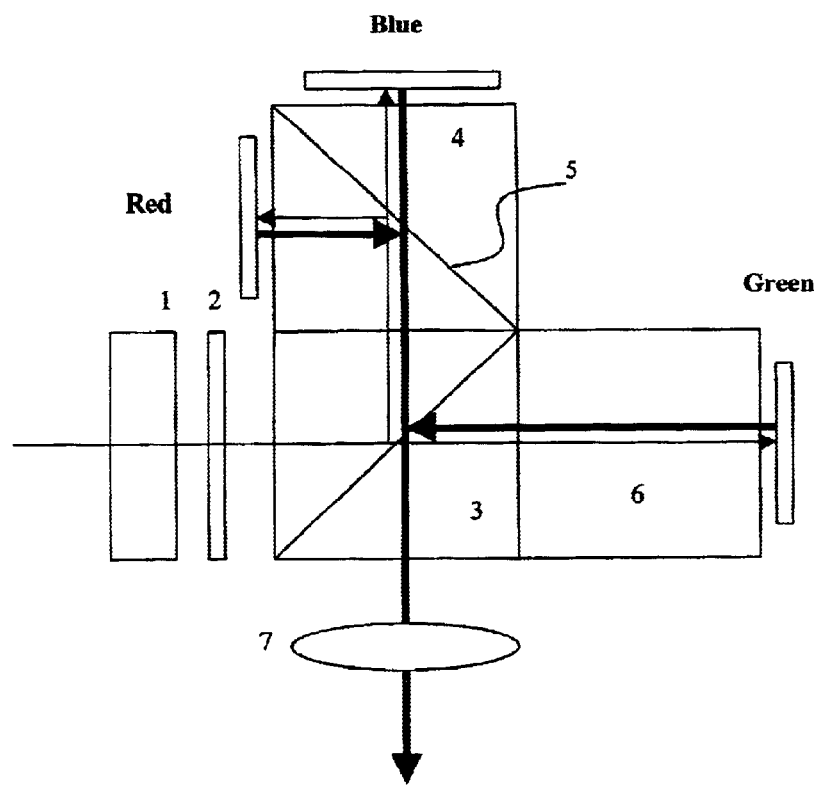
Figure 6:
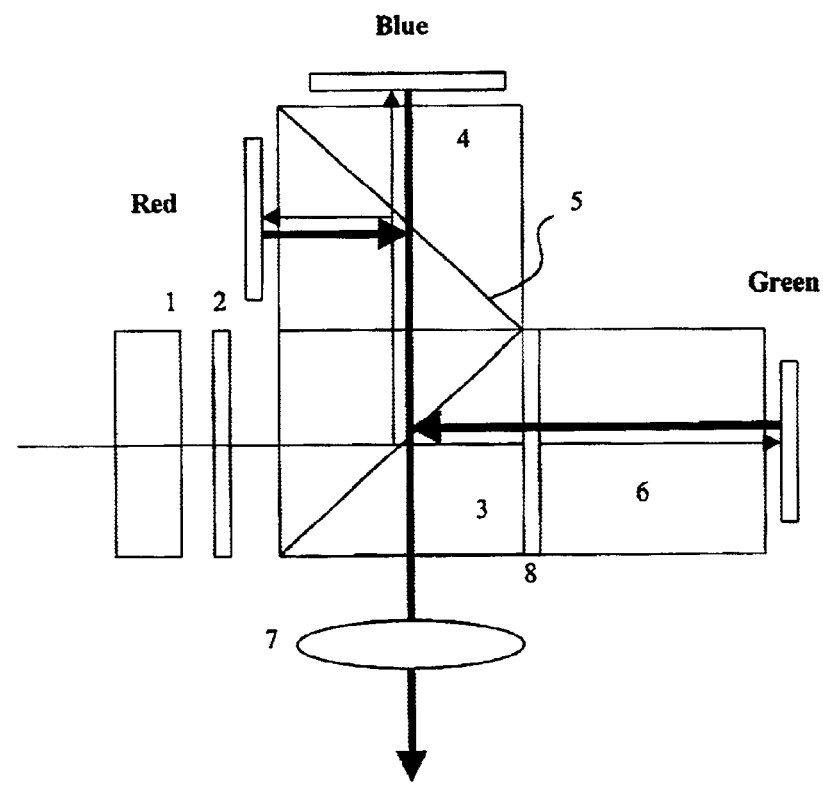

FIGS. 4–6 show 3 different variations of the first embodiment of the present invention. The reflection direction of the color filter 5 can be to the left or right of the assembly. Additionally, the color clean-up green pass filter 8 can be used in the system.

Figure 7:
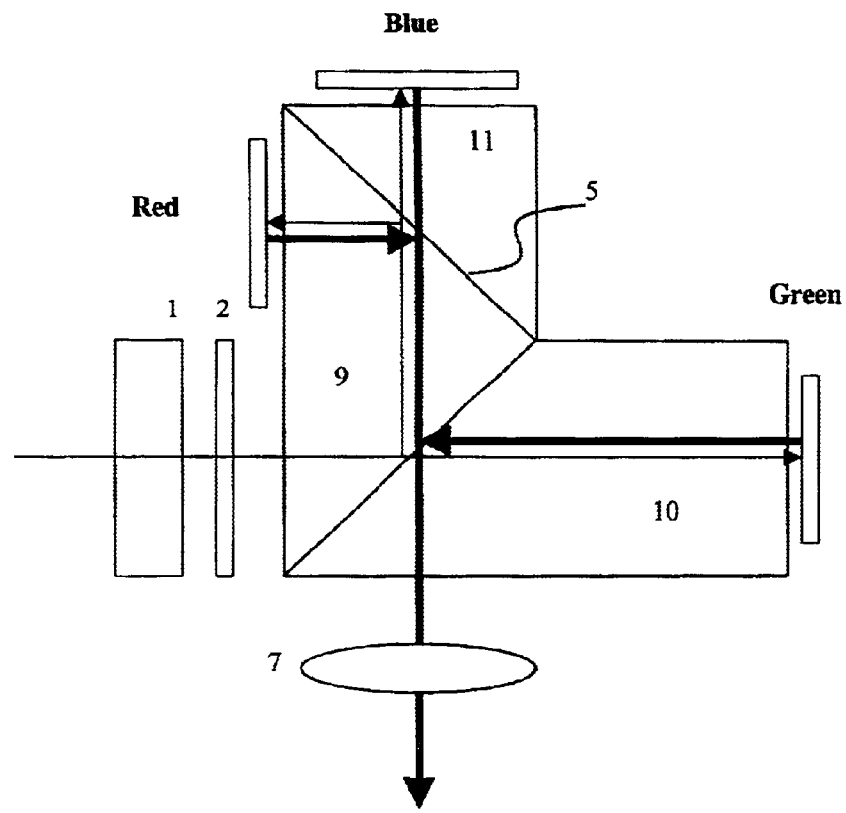
Figure 8:
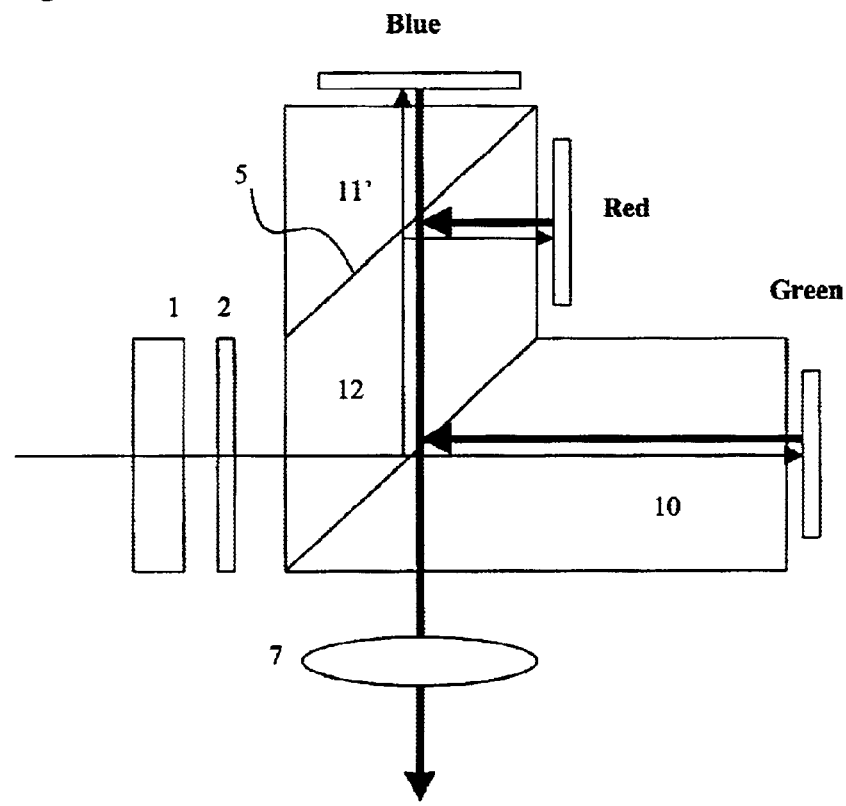

FIGS. 7 and 8 show variation of the first embodiment. In these variations, the PBS 3 and color filter cube 4 and the glass cube 6 are replaced by different pieces of glass that minimize the total number of glass in the final assembly. In FIG. 7, a large right angle prism 9, and a small right angle prism 11, and an irregular shape prism 10 are used. In FIG. 8, the glass assembly now consists of right angle prism 11', irregular prism 10, and a parallelepiped prism 12. Right angle prisms 11' and 11 are essentially the same except for a different placement.

Figure 9:
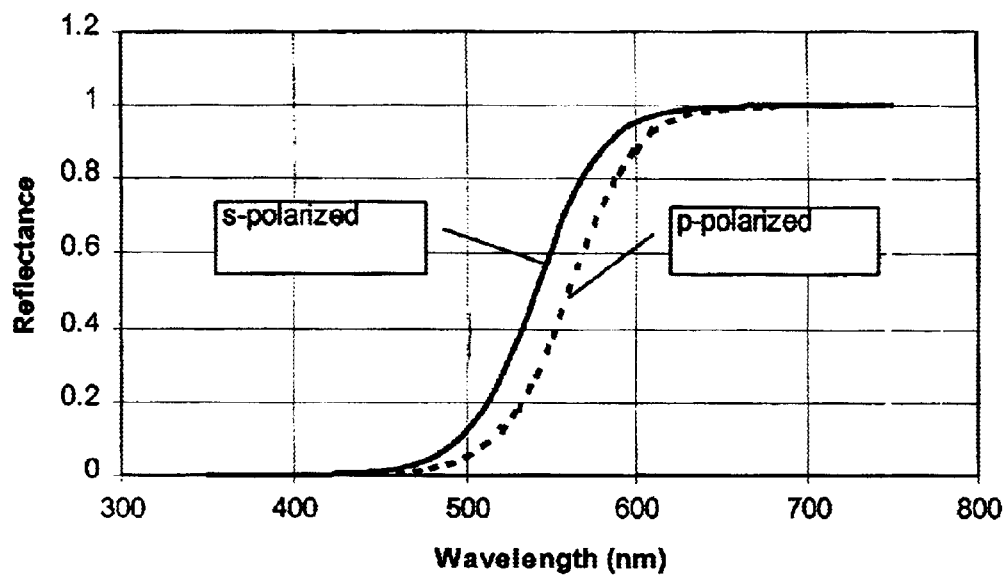
FIG. 9 shows the reflectance of the dichroic filter.
Figure 10:
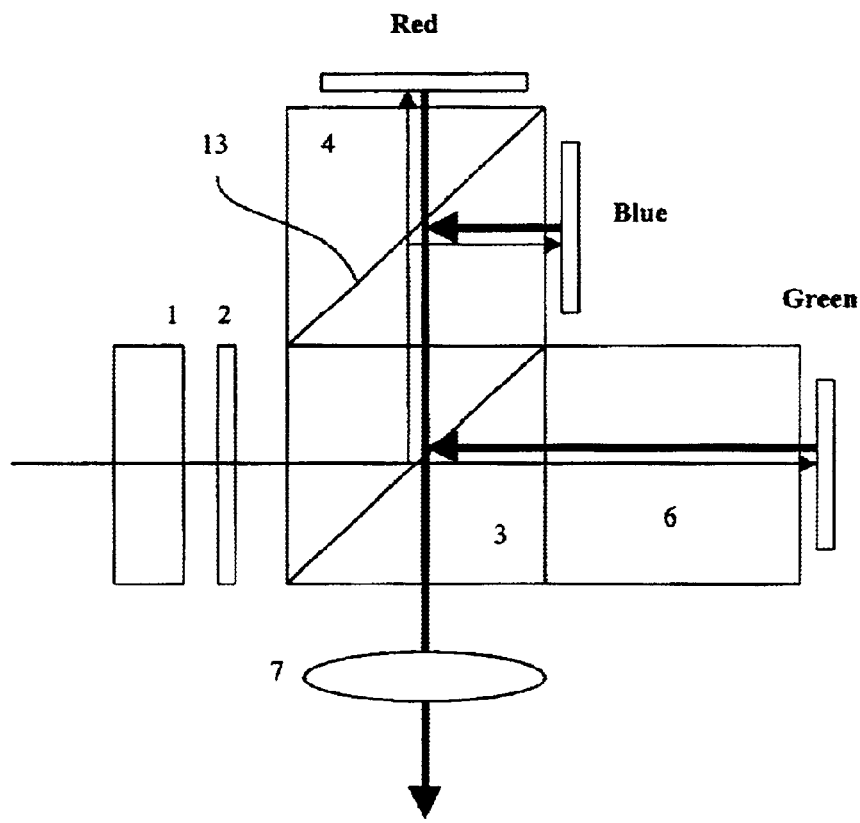
FIG. 10 shows a second preferred embodiment of the present invention.
Figure 11:
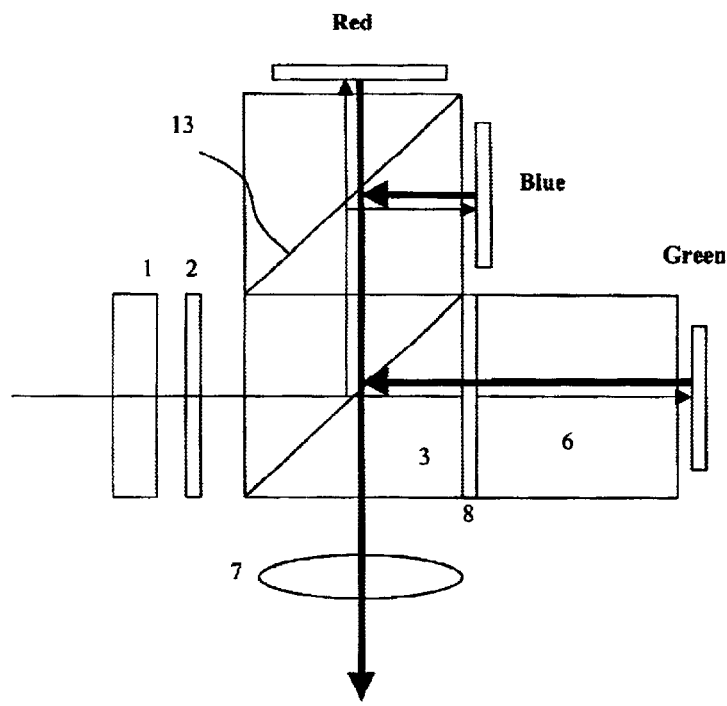
FIGS. 11–15 show variations of the second preferred embodiment of the present invention.
Figure 12:
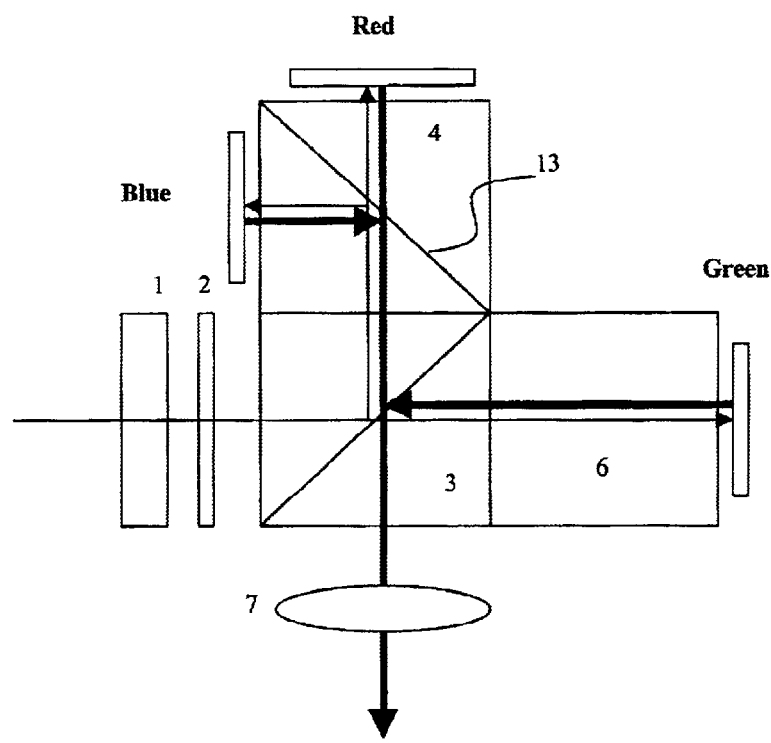
Figure 13:
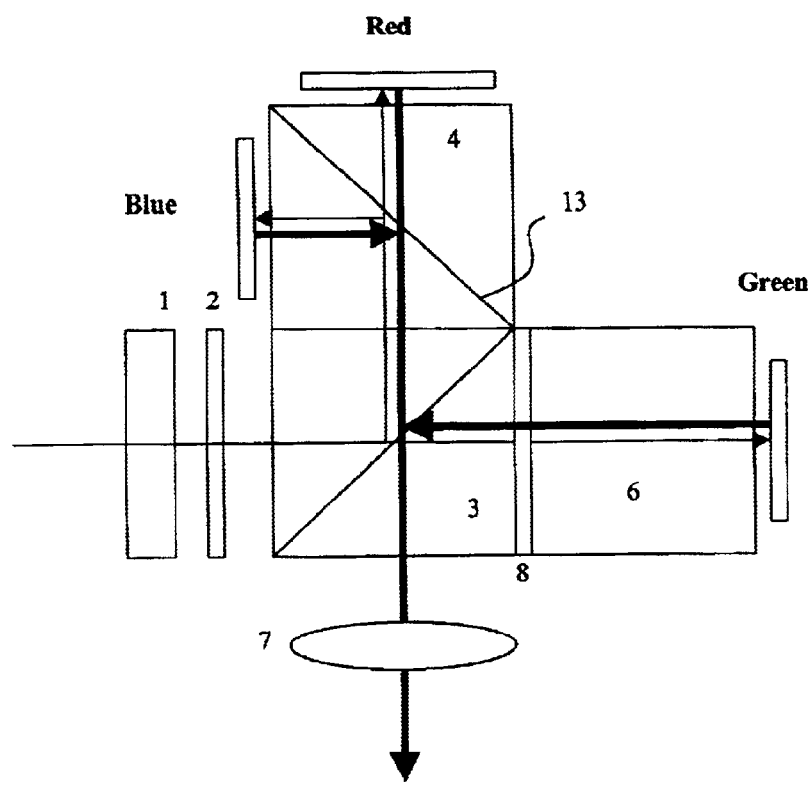
Figure 14:
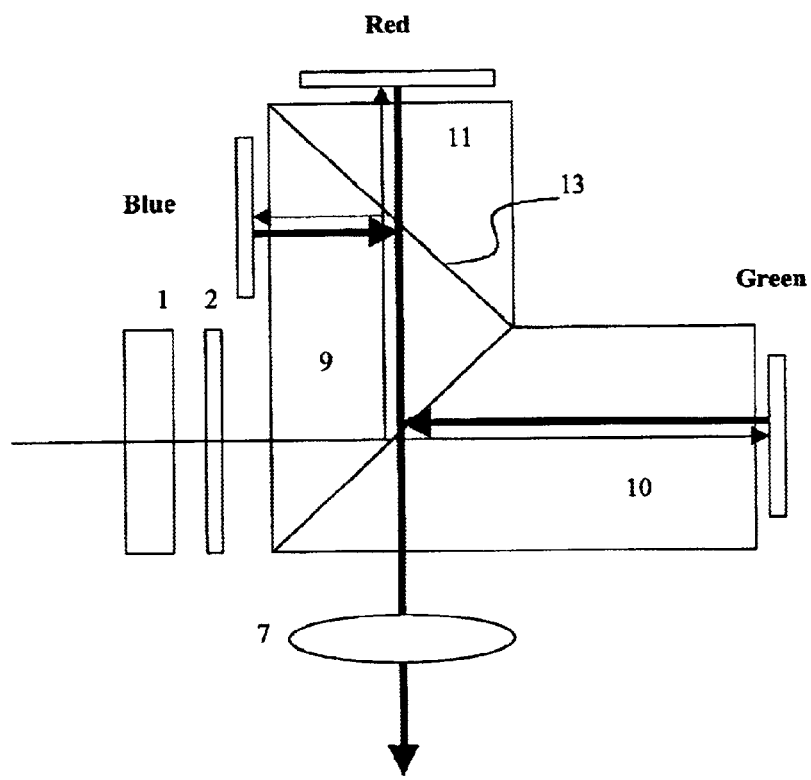
Figure 15:
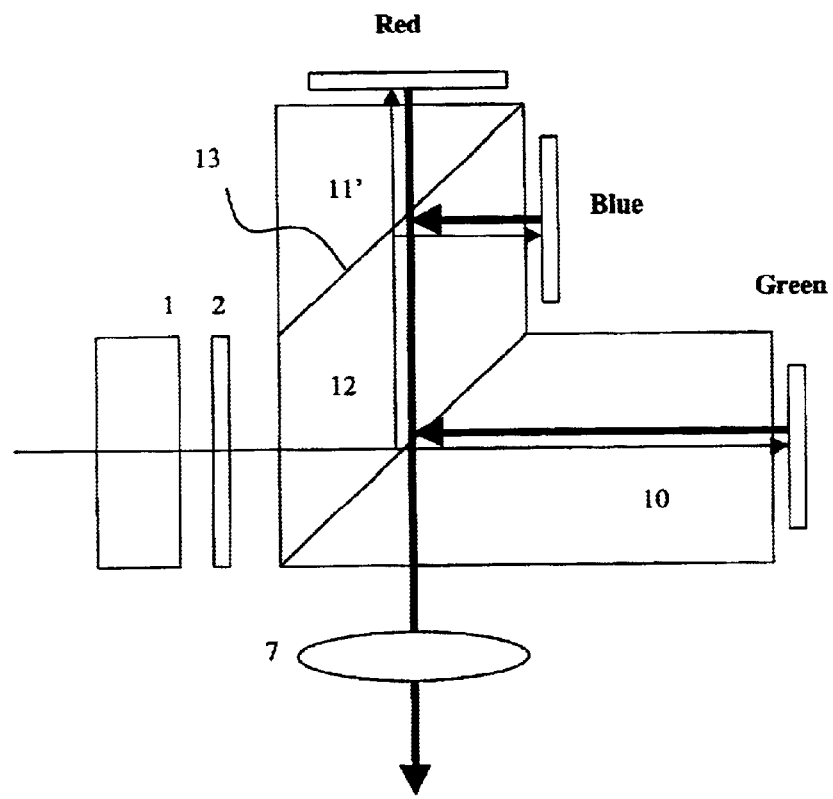

The second preferred embodiment of the present invention is shown in FIGS. 9–15. This embodiment is essentially the same as the first preferred embodiment except that the dichroic color filter 5 is replaced by dichroic color filter 13, which reflects red light and transmits blue light. FIG. 9 shows the possible reflectance spectrum of this color filter 13. FIGS. 10–15 show the different variations of this preferred embodiment. The magenta light beam can be separated into blue and red beams and reflected in two possible directions, either left or right, as shown. The green color clean-up filter 8 can also be used in some variations.

Figure 16:
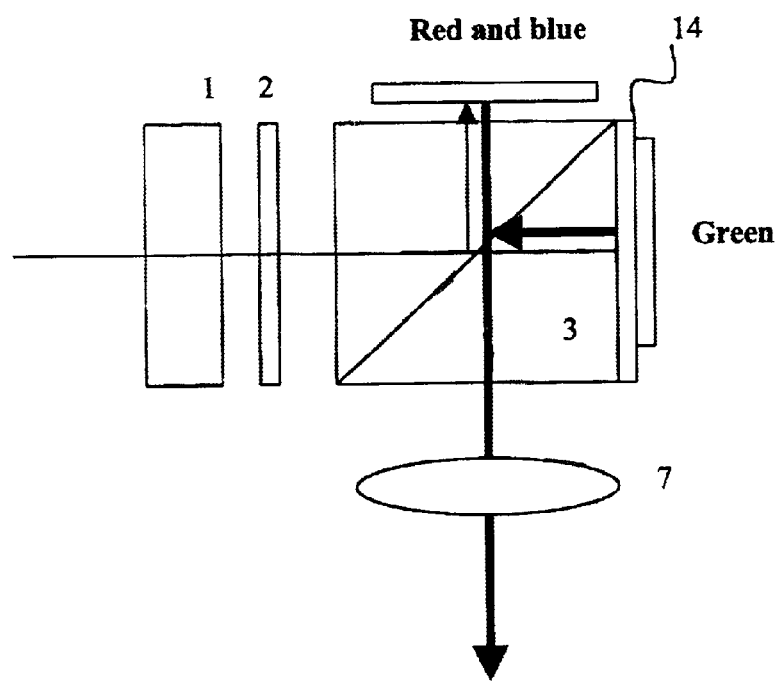
FIG. 16 shows a third preferred embodiment of the present invention.

FIG. 16 shows the third preferred embodiment of the present invention. In this arrangement, everything is the same as the first embodiment, except in the treatment of the blue and red channel. In this embodiment, the color filter splitter cube 4 and the glass cube 6 are taken out. Instead, a liquid crystal light valve (Red/Blue) having on-chip color filters is used to modulate this magenta light. The green channel is still modulated by a green liquid crystal light valve Green. Liquid crystal light valve (Red/Blue) consists of the same number of pixels as the Green light valve. But the pixels in this Red/Blue light valve is further divided into red and blue subpixels. The red and blue subpixels are defined by color filter coatings on the light valve. So the red and blue lights are modulated by different subpixels, and reflected back into the PBS 3. The modulated red green and blue lights are combined by PBS 3 and sent to projector lens 7. This embodiment has the advantage of simplicity and short optical path. The disadvantage is that half of the red light and half of the blue lights are absorbed by the on-chip color filters on light valve Red/Blue. In this preferred embodiment, there is provided also an optional green filter 14 to enhance the green color of the green channel and to balance the R, G and B colors.

Figures 16A, 16B, 17A, 17B, 18A, 18B:
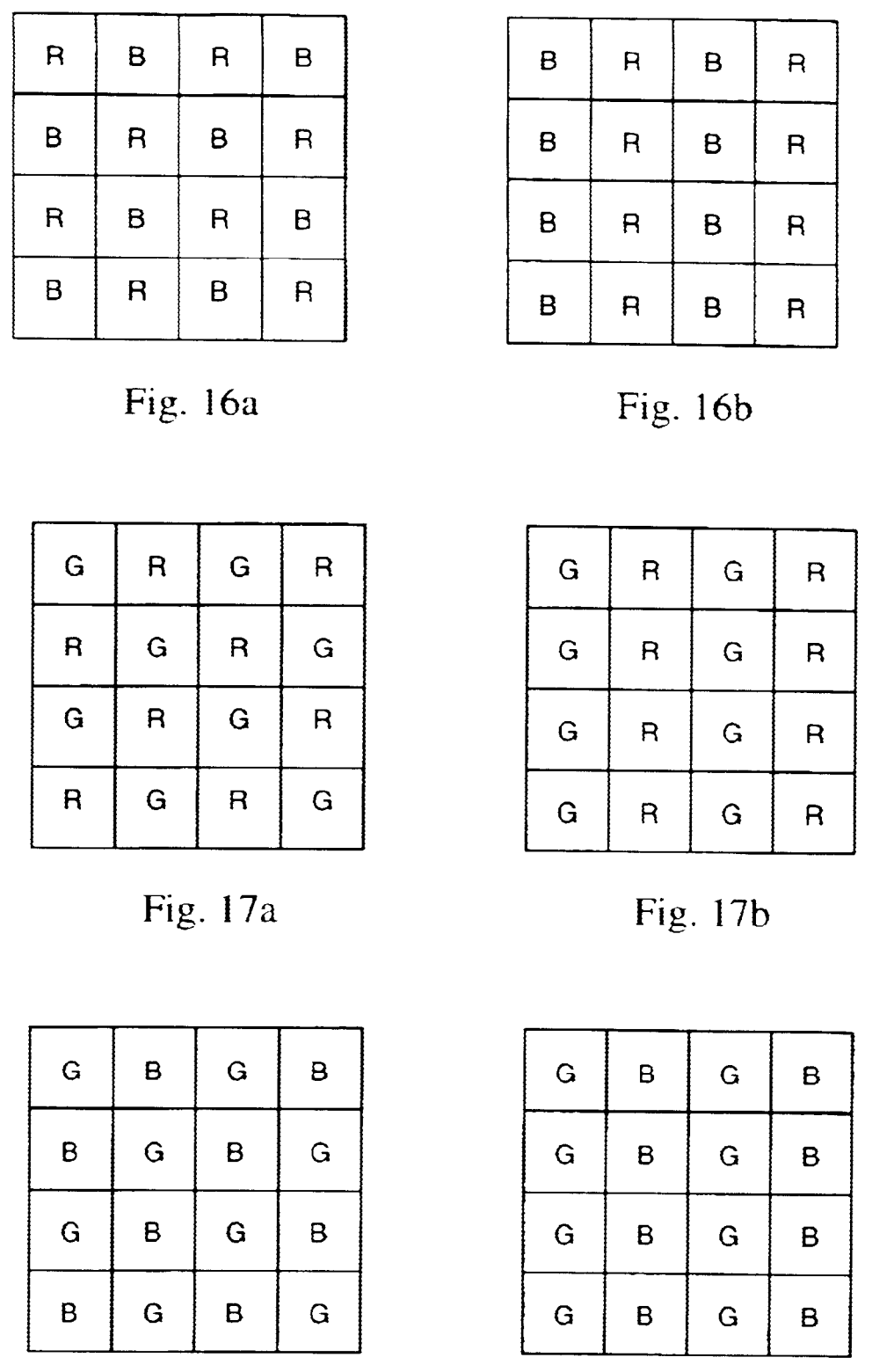

FIGS. 16a and 16b illustrate examples of the Red/Blue light valve. In FIG. 16a, the red and blue subpixels are partitioned in the form of alternating tiles. In FIG. 16b, the red and blue subpixels are partitioned in the form of alternating strips.

Figure 17:
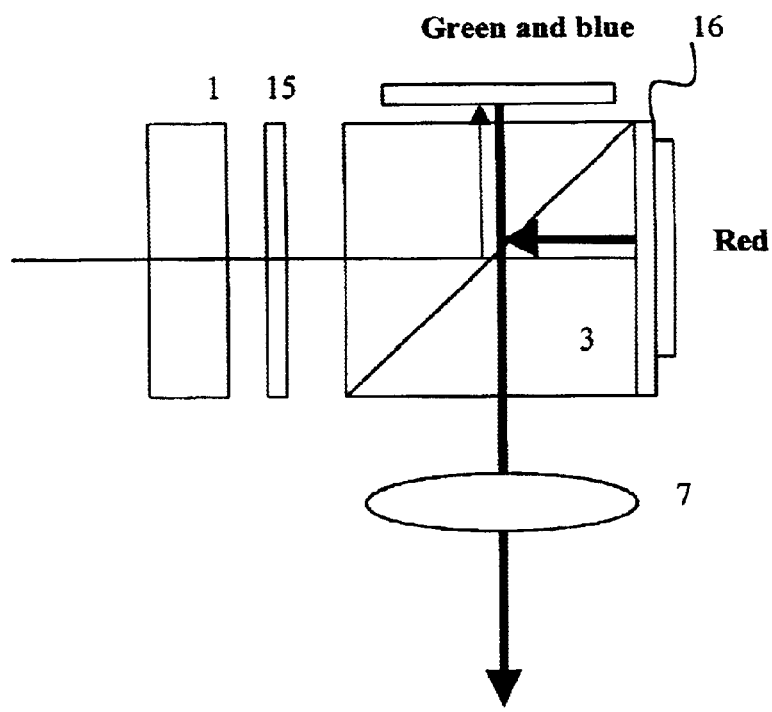
FIGS. 17 and 18 show variations of the third preferred embodiment of the present invention.
Figure 18:
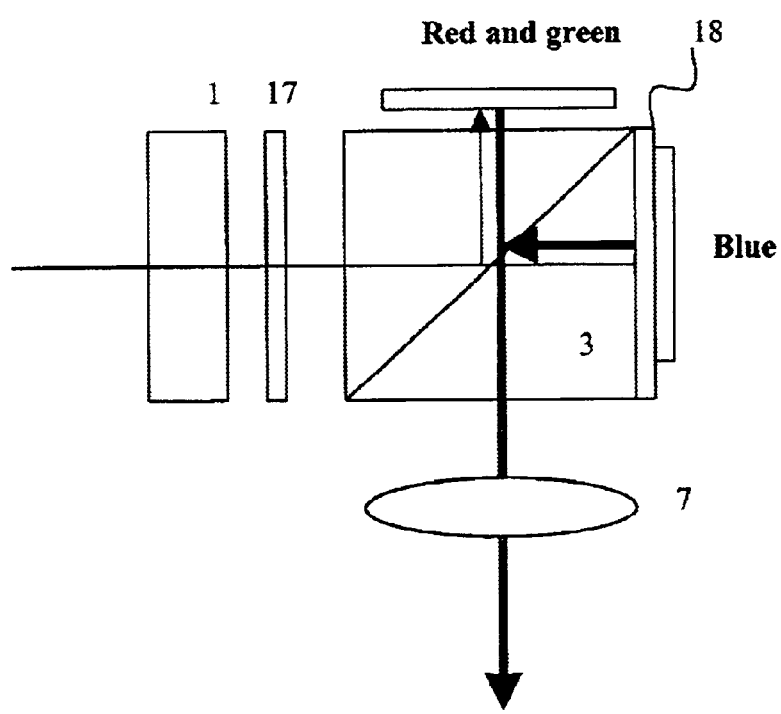

FIGS. 17 and 18 show variations of the third preferred embodiment of this invention. In FIG. 17, the polarization rotator 15 rotates the red color band of light. This red color is transmitted by the PBS 3, and is then modulated by light valve Red. The reflected light from PBS 3 is transmitted to the light valve Green/Blue and is modulated by it. There is an optional red color filter 16 that cleans up the color of the red channel.

FIGS. 17a and 17b illustrate examples of the Green/Blue light valve. In FIG. 17a, the green and blue subpixels are partitioned in the form of alternating tiles. In FIG. 17b, the green and blue subpixels are partitioned in the form of alternating strips.

FIG. 18 shows another variation where the polarization rotator 17 rotates the blue band of color. This blue color light is sent by PBS 3 into the Blue light valve. The reflected green and red light is sent to the Green/Red light valve and is modulated by it. There is an optional blue filter 18 that cleans up the blue color.

FIGS. 18a and 18b illustrate examples of the Red/Green light valve. In FIG. 18a, the red and green subpixels are partitioned in the form of alternating tiles. In FIG. 18b, the red and green subpixels are partitioned in the form of alternating strips.

Figure 19:
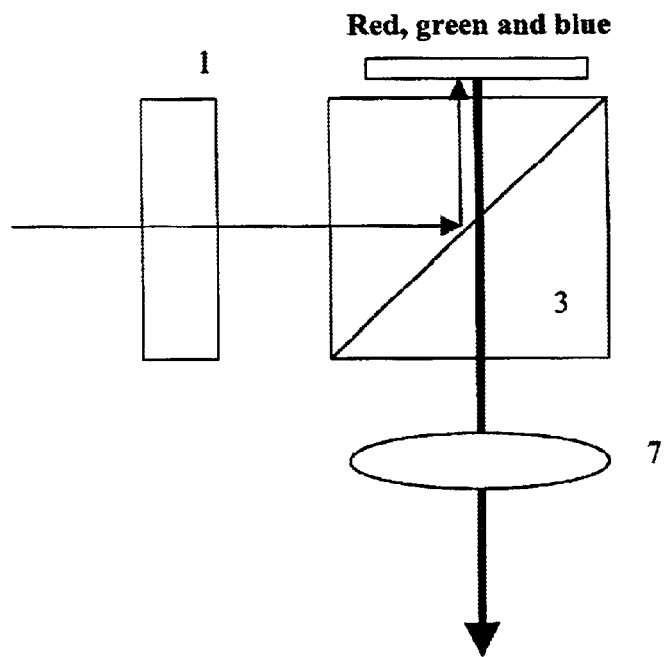
FIG. 19 shows a fourth preferred embodiment of the present invention.

FIG. 19 shows the fourth preferred embodiment of the present invention. It makes use of just one liquid crystal Red/Green/Blue light valve panel. This panel has all the color pixels on it. Polarized light is used in this embodiment without further polarization rotation.

FIGS. 19a–19d illustrate examples of a Red/Green/Blue light valve. In FIG. 19a, the pixels are arranged in a tile pattern, in FIG. 19b they are arranged in a stripe pattern, and in FIG. 19c they are arranged in a mosaic pattern. In the example of FIG. 19d, more green light is reflected than light of other colors.

Figure 20:
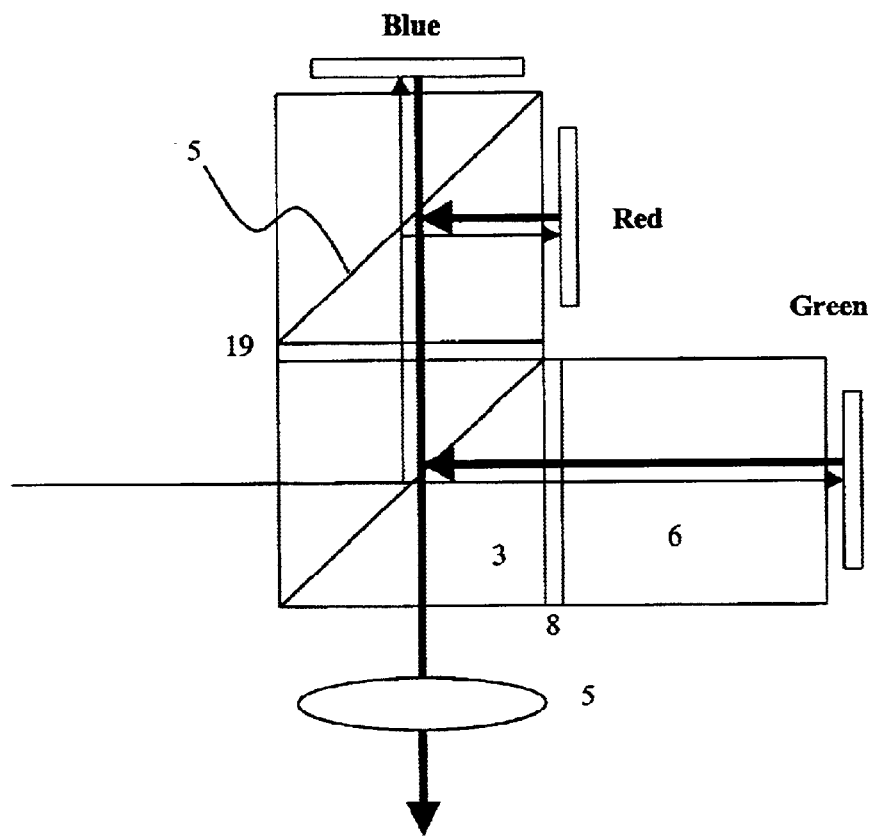
FIG. 20 shows a fifth preferred embodiment of the present invention.

FIG. 20 shows the fifth preferred embodiment of the present invention. In this case, unpolarized light is incident on the optical system. There is no polarization converter 1 nor polarization rotator 2 for the green color band. Plain white unpolarized light impinges onto the PBS 3. The p-polarized light is sent to a green color band pass filter 8, and then sent to the green liquid crystal light valve Green. A typical transmittance spectrum of this green filter 8 is shown in FIG. 21.

Figure 22:
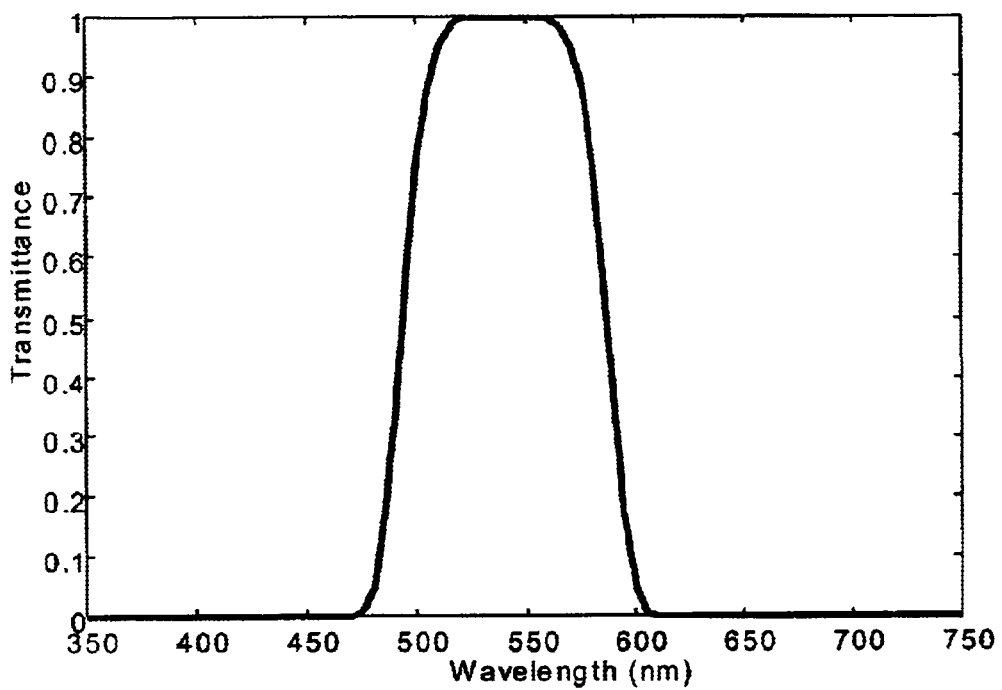
FIG. 22 shows the transmission spectrum of the green notch filter.

The s-polarized light is sent to an optional magenta color filter 19. A typical transmittance spectrum of this magenta filter 19 is shown in FIG. 22. It is essentially complementary to green filter 8. This magenta (blue plus red) light is sent to the color filter beam splitter 4 and separated into the blue and red beams by dichroic color filter 5. Each of these beams is sent to the corresponding light valves for modulation. The reflected modulated light are then recombined after retracing the original light path. The modulated recombined lights are then sent to projection lens 7.

The advantage of this preferred embodiment is that the polarization converter for the light source and the polarization rotation filter, which rotates the polarization of the green band only, are not needed. This presents significant cost savings for the optical system. However, the disadvantage is that half of the light is wasted and not used for projection.

Figure 21:
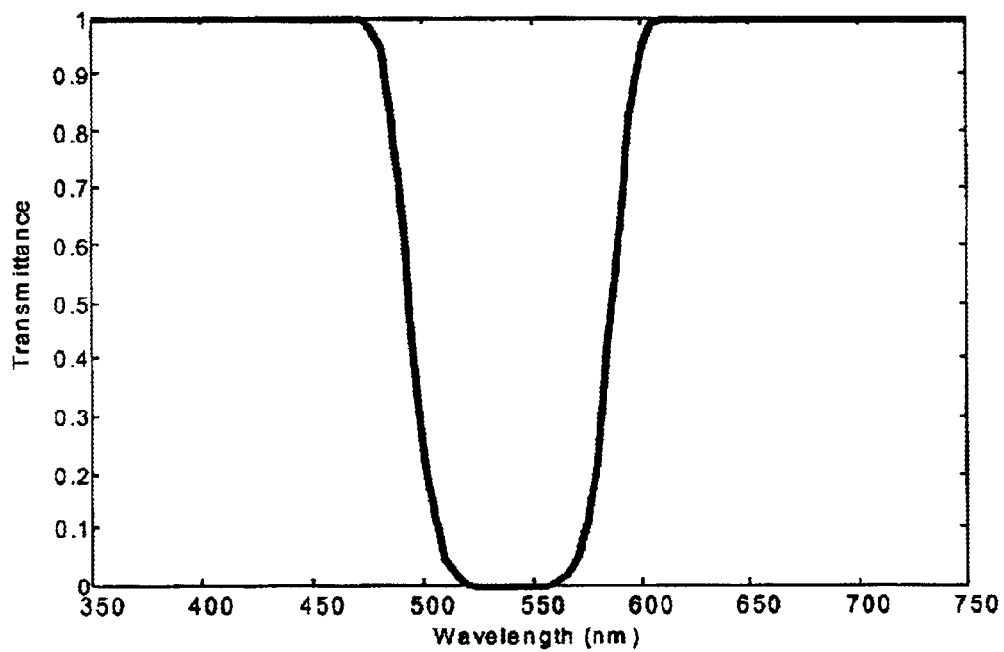
FIG. 21 shows the transmission spectrum of the green pass filter.

FIGS. 21 and 22 show the transmittance spectra of the green band pass filter 8 and the magenta pass filters 19 respectively. The exact design of the pass band wavelength depends on the light source and on optimization of the color saturation of the projector.

Figure 23:
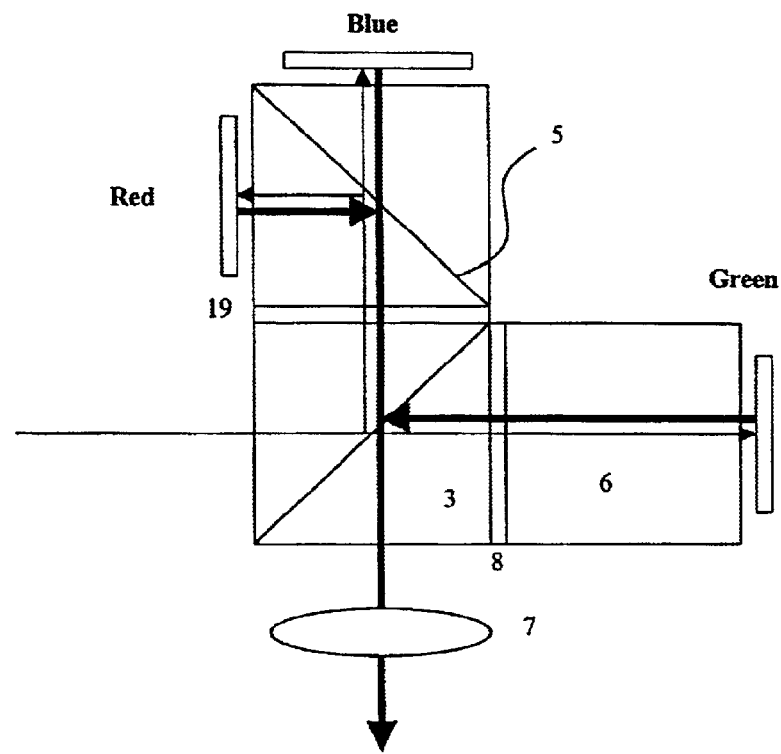
FIGS. 23–25 show variations of the fifth preferred embodiment of the present invention.
Figure 24:
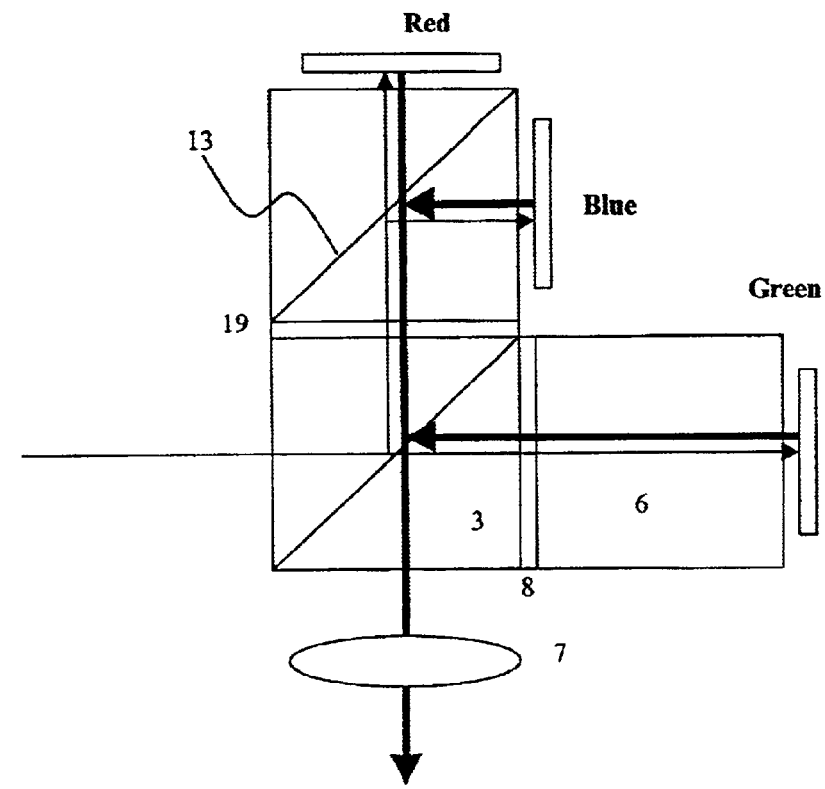
Figure 25:
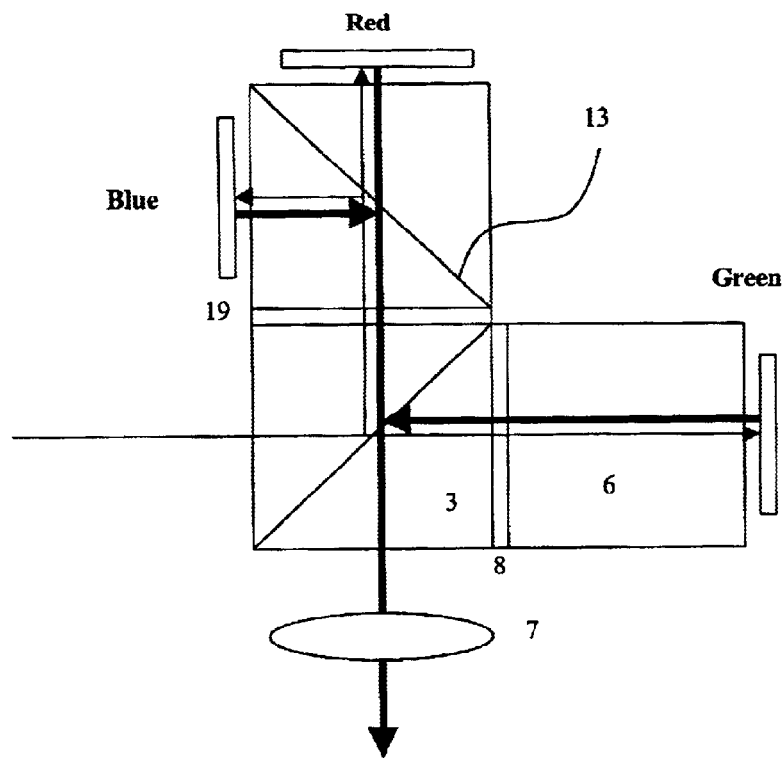

FIGS. 23–25 show variations of this fifth preferred embodiment. Similar to the first preferred embodiment, the color filter 5 can send the reflected beam either to the left or right of the assembly. Also the dichroic color filter 5 can be replaced by dichroic color filter 13 that reflects blue light instead of red light.

Figure 26:
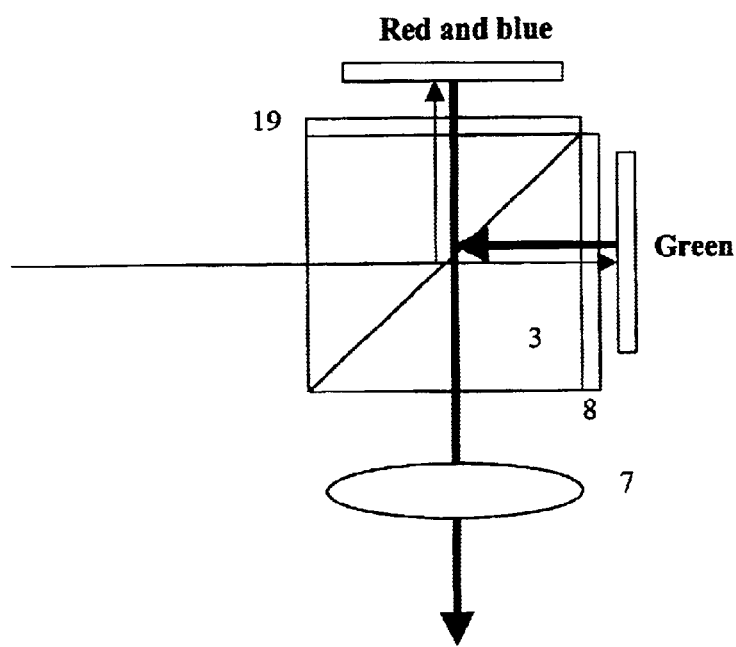
FIG. 26 shows a sixth preferred embodiment of the present invention.

FIG. 26 shows the sixth preferred embodiment of the present invention. In this preferred embodiment, unpolarized light is used without further polarization conversion. The PBS 3 separates s- and p-polarized light into 2 equal channels. In the green channel, a green band pass filter 8 is used to pass the green light only. The green light is then modulated by the green liquid crystal light valve Green. In the other channel, an optional magenta filter 19 is used to pass blue and red light bands. A liquid crystal light valve Red/Blue with on-chip color filters and subpixels for red and blue colors as used in preferred embodiment 3 is used to modulate the magenta light.

This preferred embodiment has the advantage that it is extremely simple. But the disadvantage is that only ⅓ of the light is utilized.

Figure 27:
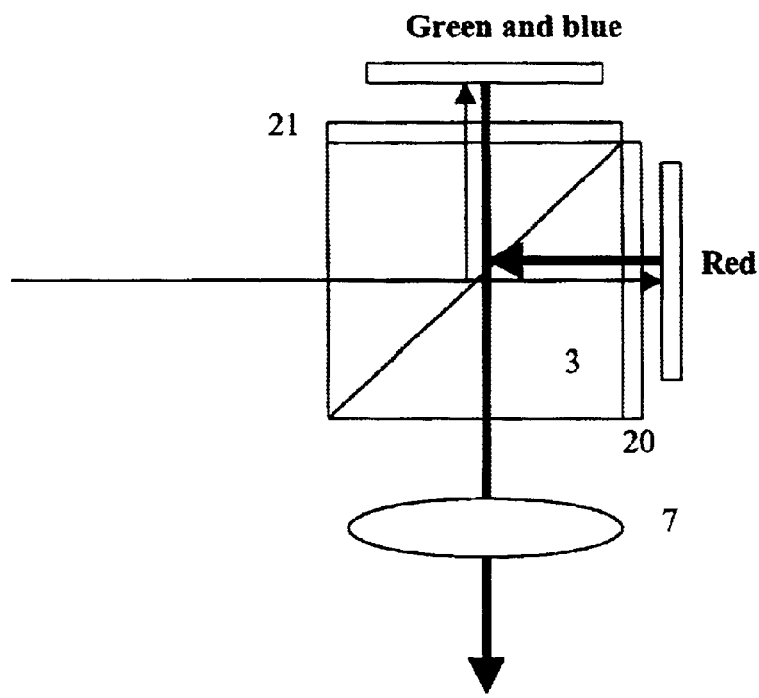
FIGS. 27 and 28 show variations of the sixth preferred embodiment of the present invention.
Figure 28:
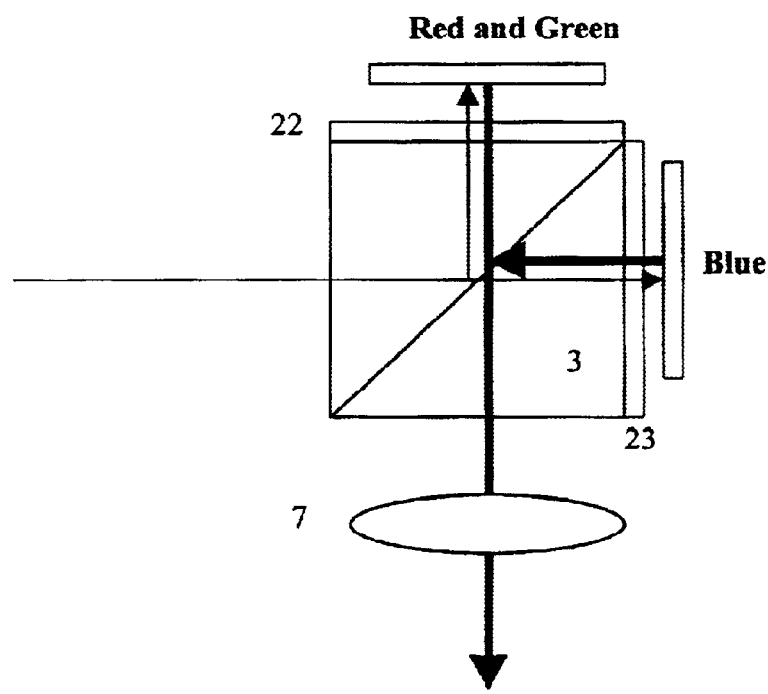

FIGS. 27 and 28 show variations of this sixth preferred embodiment. In FIG. 27, the p-polarized light after passing through PBS 3 is filtered by a red filter 20. This red light is sent to a red light valve which modulates this light. The s-polarized light reflected by PBS 3 is filtered by an optional blue/green filter 21. This blue/green channel is modulated by a blue/green light valve which has on-chip color filters to modulate the green and blue lights separately. The s- and p-polarized light can be interchanged without changing the operational principles of this preferred embodiment.

FIG. 28 shows the other variation where the blue light is sent to the Blue light valve. The remaining red and green light is sent to the Red/Green light valve.

What is claimed is:

1. An optical system for projecting an image comprising,
   a.) a light source providing a near collimated beam of white light,
   b.) means for converting most of said light into polarized light,
   c.) means for rotating the polarization direction of a band of green light of the said polarized light by 90" while leaving the polarization direction of the red and blue lights unchanged, and keeping the propagation directions of all the lights the same,
   d.) a polarizing beam splitter that separates the said green band of light from the rest of the light which is magenta in color into two orthogonal directions, having as well orthogonal polarization directions,
   e.) two reflective liquid crystal light valves that reflect respectively green and magenta colored lights, wherein said magenta reflective liquid crystal light valve is partitioned into pixels, with red and blue color filters covering alternating pixels, which are electronically controlled independently to produce images in red and blue colors separately, and
   f.) a projection lens means for projecting the combined magenta and green lights onto a screen.

2. An optical system as claimed in claim 1 wherein the said polarizing beam splitter comprises a polarizing cube with a coating designed at 45° angle of incidence that transmits p-polarized light and reflects s-polarized light.

3. An optical system as claimed in claim 1 wherein the said reflective liquid crystal light valve comprises a silicon backplane liquid crystal display.

4. An optical system as claimed in claim 1 wherein the partitioning is in the form of alternating tiles, with alternating tiles being in red and in blue colors.

5. An optical system as claimed in claim 1 wherein the partitioning of the pixels is in the form of alternating strips, with alternating strips being in red and in blue colors.

6. An optical system as claimed in claim 1 wherein the color filters in the magenta liquid crystal light valve are fabricated directly onto a silicon backplane that forms the light valve.

7. An optical system as claimed in claim 1 wherein the color filters in the magenta liquid crystal light valve are fabricated on the counter glass opposite to a silicon backplane forming the light valve.

8. An optical system as claimed in claim 1 wherein the green light is further filtered by a green filter to enhance its color purity.

9. An optical system for projecting an image comprising,
   a.) a light source providing a near collimated beam of white light,
   b.) means for converting most of said light into polarized light,
   c.) means for rotating the polarization direction of a band of red light of the said polarized light by 90° while leaving the polarization direction of the green and blue lights unchanged, and keeping the propagation directions of all the lights the same,
   d.) a polarizing beam splitter that separates the said red band of light from the rest of the light which is cyan in color into two orthogonal directions, having as well orthogonal polarization directions,
   e) two reflective liquid crystal light valves that reflect respectively red and cyan colored lights, wherein said cyan reflective liquid crystal light valve is partitioned into pixels, with green and blue color filters covering alternating pixels, which are electronically controlled independently to produce images in green and blue colors separately, and
   f.) a projection lens means for projecting the combined cyan and red lights onto a screen.

10. An optical system as claimed in claim 9 wherein the said polarizing beam splitter comprises a polarizing cube with a coating designed at 45° angle of incidence that transmits p-polarized light and reflects s-polarized light.

11. An optical system as claimed in claim 9 wherein the said reflective liquid crystal light valve comprises a silicon backplane liquid crystal display.

12. An optical system as claimed in claim 9 wherein the partitioning of the pixels in the cyan liquid crystal light valve is in the form of alternating tiles, with alternating tiles being in green and in blue colors.

13. An optical system as claimed in claim 9 wherein the partitioning of the pixels in the cyan liquid crystal light valve is in the form of alternating strips, with alternating strips being in green and in blue colors.

14. An optical system as claimed in claim 9 wherein the color filters in the cyan liquid crystal light valve are fabricated directly onto a silicon backplane that forms the light valve.

15. An optical system as claimed in claim 9 wherein the color filters in the cyan liquid crystal light valve are fabricated on the counter glass opposite to a silicon backplane forming the light valve.

16. An optical system as claimed in claim 9 wherein the red light is further filtered by a red filter to enhance its color purity.

17. An optical system for projecting an image comprising,
   a.) a light source providing a near collimated beam of white light,
   b.) means for converting most of said light into polarized light.
   c.) means for rotating the polarization direction of a band of blue light of the said polarized light by 90° while leaving the polarization direction of the red and green lights unchanged, and keeping the propagation directions of all the lights the same,
   d.) a polarizing beam splitter that separates the said blue band of light from the rest of the light which is yellow in color into two orthogonal directions, having as well orthogonal polarization directions,
   e.) two reflective liquid crystal light valves that reflect respectively blue and yellow colored lights, wherein said yellow reflective liquid crystal light valve is partitioned into pixels, with red and green color filters covering alternating pixels, which are electronically controlled independently to produce images in red and green colors separately, and f.) a projection lens means for projecting the combined yellow and blue lights onto a screen.

18. An optical system as claimed in claim 17 wherein the said polarizing beam splitter comprises a polarizing cube with a coating designed at 45° angle of incidence that transmits p-polarized light and reflects s-polarized light.

19. An optical system as claimed in claim 17 wherein the said reflective liquid crystal light valve comprises a silicon backplane liquid crystal display.

20. An optical system as claimed in claim 17 wherein the partitioning of the pixels in the yellow liquid crystal light valve is in the form of alternating tiles, with alternating tiles being in red and in green colors.

21. An optical system as claimed in claim 17 wherein the partitioning of the pixels in the yellow liquid crystal light valve is in the form of alternating strips, with alternating strips being in red and in green colors.

22. An optical system as claimed in claim 17 wherein the color filters in the yellow liquid crystal light valve are fabricated directly onto a silicon backplane that forms the light valve.

23. An optical system as claimed in claim 17 wherein the color filters in the yellow liquid crystal light valve are fabricated on the counter glass opposite to a silicon backplane forming the light valve.

24. An optical system as claimed in claim 17 wherein the blue light is further filtered by a blue filter to enhance its color purity.

25. An optical system for projecting an image comprising,
a.) a light source providing a near collimated beam of light,
b.) a polarizing beam splitter that separates the incident light into two orthogonal directions, having orthogonal polarization directions,
c.) a green band pass optical filter that passes only green light placed along one of the separated beams,
d.) a magenta pass filter that passes blue and red light placed along the other separated beam,
e.) a polarization independent dichroic beam splitter that separates the said magenta light further into a blue and a red beam of light that propagate in two orthogonal directions,
f.) three reflective liquid crystal light valves that reflect respectively red, green and blue lights, thus forming separately red, green and blue images, and
g.) a projection lens means for projecting the combined red, green and blue lights onto a screen.

26. An optical system as claimed in claim 25 wherein the said polarizing beam splitter comprises a polarizing cube with a coating designed at 45° angle of incidence that transmits p-polarized light and reflects s-polarized light.

27. An optical system as claimed in claim 25 wherein the said dichroic beam splitter is designed for 450° angle of incidence.

28. An optical system as claimed in claim 25 wherein the said dichroic beam splitter is able to reflect or transmit red color light of both s- and p-polarizations.

29. An optical system as claimed in claim 25 wherein the said dichroic beam splitter is able to reflect or transmit blue color light of both s- and p-polarizations.

30. An optical system as claimed in claim 25 wherein the said reflective liquid crystal light valves are silicon backplane liquid crystal displays.

31. An optical system for projecting an image comprising,
a.) a light source providing a near collimated beam of white light,
b.) a polarizing beam splitter that separates the incident light into two orthogonal directions, having orthogonal polarization directions,
c.) a green band pass optical filter that passes only green light placed along one of the separated beams,
d.) two reflective liquid crystal light valves that reflect respectively green and magenta lights, wherein said magenta reflective liquid crystal light valve is partitioned into pixels, with red and blue color filters covering alternating pixels, which are electronically controlled independently to produce images in red and blue colors separately, and
e.) a projection lens means for projecting the combined green and magenta lights onto a screen.

32. An optical system as claimed in claim 31 wherein the said polarizing beam splitter comprises a polarizing cube with a coating designed at 450° angle of incidence that transmits p-polarized light and reflects s-polarized light.

33. An optical system as claimed in claim 31 wherein a magenta pass filter that passes blue and red light is placed along the other separated beam.

34. An optical system as claimed in claim 31 wherein the said reflective liquid crystal light valves comprise a silicon backplane liquid crystal displays.

35. An optical system as claimed in claim 31 wherein the said magenta reflective liquid crystal light valve is partitioned into pixels, with red and blue color filters built onto alternating pixels which are electronically controlled independently to produce images in red and blue colors separately.

36. An optical system as claimed in claim 35 wherein the partitioning of the pixels in the magenta liquid crystal light valve is in the form of alternating tiles, with alternating tiles being in red and in blue colors.

37. An optical system as claimed in claim 35 wherein the partitioning of the pixels in the magenta liquid crystal light valve is in the form of alternating strips, with alternating strips being in red and in blue colors.

38. An optical system as claimed in claim 37 wherein the color filters in the magenta liquid crystal light valve are fabricated directly onto a silicon backplane that forms the light valve.

39. An optical system as claimed in claim 35 wherein the color filters in the magenta liquid crystal light valve are fabricated on the counter glass opposite to a silicon backplane forming the light valve.

40. An optical system for projecting an image comprising,
a.) a light source providing a near collimated beam of white light,
b.) a polarizing beam splitter that separates the incident light into two orthogonal directions, having orthogonal polarization directions,
c.) a red band pass optical filter that passes only red light placed along one of the separated beams,
d.) two reflective liquid crystal light valves that reflect respectively red and cyan lights, wherein said cyan reflective liquid crystal light valve is partitioned into pixels. with green and blue color filters covering alternating pixels which, are electronically controlled independently to produce images in green and blue colors separately, and
e.) a projection lens means for projecting the combined the reflected red and cyan lights onto a screen.

41. An optical system as claimed in claim 40 wherein the said polarizing beam splitter comprises a polarizing cube with a coating designed at 45° angle of incidence that transmits p-polarized light and reflects s-polarized light.

42. An optical system as claimed in claim 40 wherein a cyan pass filter that passes blue and green light can be placed along the other separated beam.

43. An optical system as claimed in claim 40 wherein the said reflective liquid crystal light valves comprise silicon backplane liquid crystal displays.

44. An optical system as claimed in claim 40 wherein the said cyan reflective liquid crystal light valve is partitioned into pixels, with green and blue color filters built onto alternating pixels which are electronically controlled independently to produced images in green and blue colors separately.

45. An optical system as claimed in claim 44 wherein the partitioning of the pixels in the cyan liquid crystal light valve is in the form of alternating tiles, with alternating tiles being in green and in blue colors.

46. An optical system as claimed in claim 44 wherein the partitioning of the pixels in the magenta liquid crystal light valve is in the form of alternating strips, with alternating strips being in green and in blue colors.

47. An optical system as claimed in claim 44 wherein the color filters in the cyan liquid crystal light valve are fabricated directly onto a silicon backplane directly that forms the light valve.

48. An optical system as claimed in claim 44 wherein the color filters in the cyan liquid crystal light valve are fabricated on the counter glass opposite to a silicon backplane forming the light valve.

49. An optical system for projecting an image comprising,
   a.) a light source providing a near collimated beam of white light,
   b.) a polarizing beam splitter that separates the incident light into two orthogonal directions, having orthogonal polarization directions,
   c.) a blue band pass optical filter that passes only blue light placed along one of the separated beams,
   d.) two reflective liquid crystal light valves that reflect respectively blue and yellow light, wherein said yellow reflective liquid crystal light valve is partitioned into pixels, with red and green color filters covering alternating pixels, which are electronically controlled independently to produce images in red and green colors separately, and
   e.) a projection lens means for projecting the combined yellow and blue reflected light onto a screen.

50. An optical system as claimed in claim 49 wherein the said polarizing beam splitter comprises a polarizing cube with a coating designed at 45° angle of incidence that transmits p-polarized light and reflects s-polarized light.

51. An optical system as claimed in claim 49 wherein a yellow pass filter that passes green and red light can be placed along the other separated beam.

52. An optical system as claimed in claim 49 wherein the said reflective liquid crystal light valves comprise silicon backplane liquid crystal displays.

53. An optical system as claimed in claim 49 wherein the said yellow reflective liquid crystal light valve is partitioned into pixels, with red and green color filters built onto alternating pixels which are electronically controlled independently to produce images in red and green colors separately.

54. An optical system as claimed in claim 53 wherein the partitioning of the pixels in the yellow liquid crystal light valve is in the form of alternating tiles, with alternating tiles being in red and in green colors.

55. An optical system as claimed in claim 53 wherein the partitioning of the pixels in the yellow liquid crystal light valve is in the form of alternating strips, with alternating strips being in red and in green colors.

56. An optical system as claimed in claim 53 wherein the color filters in the yellow liquid crystal light valve are fabricated directly onto a silicon backplane that forms the light valve.

57. An optical system as claimed in claim 53 wherein the color filters in the yellow liquid crystal light valve are fabricated on the counter glass opposite to a silicon backplane forming the light valve.

58. An optical system for projecting an image comprising,
   a.) a light source providing a near collimated beam of light,
   b.) a means of converting most of said light into polarized light,
   c.) a polarizing beam splitter,
   d.) a reflective liquid crystal light valve constructed with an array of pixels which are covered with color filter coatings arranged in a mosaic of red, green and blue colors, and
   e.) a projection lens means for projecting the image formed on the said liquid crystal light valve onto a screen.

59. An optical system as claimed in claim 58 wherein the said liquid crystal light valve comprises a silicon microdisplay.

60. An optical system for projecting an image comprising,
   a.) a light source providing a near collimated beam of light,
   b.) a polarizing beam splitter that separates the incident light into two orthogonal directions, having orthogonal polarization directions,
   c.) a green band pass optical filter that passes only green light placed along one of the separated beams,
   d.) a magenta pass filter that passes blue and red light place along the other separated beam,
   e.) two reflective liquid crystal light valves that reflect respectively green and magenta lights, and
   f.) a projection lens means for projecting the combined green and magenta lights onto a screen.

61. An optical system for projecting an image comprising,
   a.) a light source providing a near collimated beam of light,
   b.) a polarizing beam splitter that separates the incident light into two orthogonal directions, having orthogonal polarization directions,
   c.) a red band pass optical filter that passes only red light placed along one of the separated beams,
   d.) a cyan pass filter that passes blue and green light placed along the other separated beam,
   e.) two reflective liquid crystal light valves that reflect respectively red and cyan lights, and
   f.) a projection lens means for projecting the combined the reflected red and cyan lights onto a screen.

62. An optical system for projecting an image comprising,
   a.) a light source providing a near collimated beam of light,
   b.) a polarizing beam splitter that separates the incident light into two orthogonal directions, having orthogonal polarization directions,
   c.) a blue band pass optical filter that passes only blue light placed along one of the separated beams,
   d.) a yellow pass filter that passes green and red light placed along the other separated beam,
   e.) two reflective liquid crystal light valves that reflect respectively blue and yellow light, and
   f.) a projection lens means for projecting the combined yellow and blue reflected light onto a screen.

* * * * *